(12) United States Patent
Pearson

(10) Patent No.: US 11,402,256 B2
(45) Date of Patent: Aug. 2, 2022

(54) WEIGH-IN-MOTION SYSTEM WITH CHANNEL DATA

(71) Applicant: Rinstrum Pty. Ltd., Acacia Ridge Qld. (AU)

(72) Inventor: Darren J. Pearson, Queensland (AU)

( * ) Notice: Subject to any disclaimer, the term of this patent is extended or adjusted under 35 U.S.C. 154(b) by 265 days.

(21) Appl. No.: 16/893,872

(22) Filed: Jun. 5, 2020

(65) Prior Publication Data

US 2020/0386607 A1   Dec. 10, 2020

Related U.S. Application Data

(60) Provisional application No. 62/857,943, filed on Jun. 6, 2019.

(51) Int. Cl.
  *G01G 19/02*  (2006.01)
  *G01G 19/414* (2006.01)

(52) U.S. Cl.
  CPC ......... *G01G 19/024* (2013.01); *G01G 19/414* (2013.01)

(58) Field of Classification Search
  CPC .. G01G 19/022; G01G 19/024; G01G 19/021; G01G 19/03; G01G 19/035; G01G 19/414
  See application file for complete search history.

(56) References Cited

U.S. PATENT DOCUMENTS

| | | | |
|---|---|---|---|
| 3,966,001 A | 6/1976 | Goldberg | |
| 4,066,140 A | 1/1978 | Conley | |
| 4,280,576 A | 7/1981 | Smith, Jr. | |
| 4,475,610 A | 10/1984 | Schwarzschild | |
| 4,828,055 A | 5/1989 | Hamilton et al. | |
| 5,446,248 A | 8/1995 | Strasser | |
| 6,706,976 B1 | 3/2004 | Schuler | |
| 8,461,466 B2 | 6/2013 | Sagarsee et al. | |
| 9,012,792 B2 | 4/2015 | Gui | |
| 9,470,574 B2 | 10/2016 | Lawn et al. | |
| 10,203,241 B2 | 2/2019 | Lawn et al. | |

(Continued)

FOREIGN PATENT DOCUMENTS

| | | | | |
|---|---|---|---|---|
| EP | 2650659 A1 | * | 10/2013 | ........... G01G 19/024 |
| EP | 2650659 A1 | | 10/2013 | |

(Continued)

OTHER PUBLICATIONS

International Preliminary Report on Patentability corresponding to International Application No. PCT/IB2020/000445 dated Dec. 7, 2021 (8 pages).

(Continued)

*Primary Examiner* — Manuel L Barbee
(74) *Attorney, Agent, or Firm* — Maginot, Moore & Beck LLP

(57) ABSTRACT

A weigh-in-motion system includes a base, a load cell assembly supporting a leading edge of a platform structure movable with respect to the base, and a load cell assembly supporting a trailing edge of the platform. A processor is configured to execute program instructions in a memory to obtain load profile data generated by the load cells and to determine a weight associated with a vehicle using the load profile data. The processor is further configured to execute the program instructions to generate an output based upon the determined weight.

16 Claims, 12 Drawing Sheets

(56) References Cited

U.S. PATENT DOCUMENTS

| | | | |
|---|---|---|---|
| 2013/0112487 A1 | 5/2013 | Wagstaff et al. | |
| 2014/0014415 A1 | 1/2014 | Stovern | |
| 2015/0226598 A1* | 8/2015 | Lawn ................... | G01G 19/021 |
| | | | 177/136 |
| 2016/0153828 A1 | 6/2016 | Kneubühl et al. | |
| 2019/0107433 A1* | 4/2019 | Valdemarsson ...... | G01G 19/035 |

FOREIGN PATENT DOCUMENTS

| KR | 10-2011-0102067 A | 9/2011 |
|---|---|---|
| KR | 10-2013-0032090 A | 4/2013 |

OTHER PUBLICATIONS

International Search Report corresponding to International Application No. PCT/IB2020/000445 dated Sep. 18, 2020 (3 pages).

\* cited by examiner

WEIGH-IN-MOTION SYSTEM WITH CHANNEL DATA

This application claims the benefit of U.S. Provisional Application No. 62/857,943 filed Jun. 6, 2019, the entire contents of which is herein incorporated by reference.

TECHNICAL FIELD

This disclosure relates generally to weighing systems, and, in particular, to weigh-in-motion systems for weighing a load while the load is moving.

BACKGROUND

Weighing carriers in order to ascertain either the total weight of the carrier and/or the weight of the load borne by the carrier is commonly desired. For example, vehicles operating on roadways are often weighed to determine the axle weight and the total weight of the vehicle. In some operations, the weight of the vehicle is important to ensure compliance with weight restrictions on public roadways. Owners and operators of vehicles exceeding maximum legal weights are subject to fines, and in the event of an accident, can be subject to substantial financial liability for operating a vehicle exceeding the maximum legal weight. It is therefore desirable to weigh trucks and other vehicles which will be operating on public roadways.

One way vehicles are weighed is by driving the vehicle onto a static scale that is large enough to accommodate the entire vehicle. While such a scale is typically accurate to determine the load carried by the vehicle, such scales are very large and very expensive, and must be capable of accommodating and accurately measuring substantial weights. Furthermore, such scales do not enable determination of the weight carried by each individual axle of the vehicle.

Another weighing system involves driving the vehicle onto a smaller scale sized to weigh each individual axle. Such scales typically require driving the axles onto the scale individually, and stopping to weigh each axle. As the vehicle stops and restarts, the load carried by the vehicle can shift, resulting in weight readings that are not accurate. Additionally, the suspension of the vehicle can shift during the stopping and restarting of the vehicle, further reducing the accuracy of the weight measurement.

Some vehicle scales, such as the axle scale 20 shown in FIG. 1, are designed to weigh each axle of the vehicle as the vehicle moves over the scale 20 at a constant speed. Such scales typically include four load cells (only two are shown in FIG. 1) 24, 26 positioned underneath the scale, one located in each corner positioned inwardly from the outer edges of the weighing portion, also known as the active section 28. As the vehicle tires 32 pass over the active section of the scale, the load cells 24, 26 are compressed, and generate a load signal representing the weight of the axle passing over the scale 20.

However, as the vehicle tires 32 first roll onto the active section 28, the downward force 36 from the vehicle is outside an area between the load cells 24, 26 located under the active section 28. A moment 40 is therefore generated, whereby the load cells 26 opposite the tires 32 are urged upwardly (arrow 38) while the load cells 24 nearest the tires 32 are urged downwardly (arrow 39). A moment is generated in the opposite direction as the wheels pass the load cells under the opposite side of the active section. These moments affect the accuracy of the weight measurement, and make it more difficult to obtain a weight reading of the moving axles.

Additionally, in a typical axle scale 20, the load cells 24, 26 are designed to measure a compression force generated by the additional weight of the vehicle axle on the scale. The load cells 24, 26 support the platform of the active section 28 of the scale 20 from underneath the platform, as shown in FIGS. 1 and 2. As the vehicle tires 32 roll onto the platform, the momentum of the wheels urges the platform in the horizontal direction of movement of the vehicle, illustrated by arrow 44. This movement generates a moment 48 about the support of the load cells 24, 26, resulting in forward and downward movement of the active section 28 relative to the support of the load cells 24, 26. The downward force 36 from of the weight of the load further supplements the forward and downward movement of the active section 28. This forward and downward movement can result in inaccurate weighing of the vehicle.

In some scales, the platform is designed to abut against a stop located outside the active section of the scale in order to arrest this forward and downward movement, and the scale then settles back into the natural position. While such a solution is effective to stop the forward movement, it takes time for the platform to move against the stop and stabilize, increasing the time the axle must be on the scale to produce a weight reading.

A weigh-in-motion system for loads that has improved measurement accuracy is therefore desirable. Furthermore, it would be desirable to produce a weigh-in-motion system for loads that provides data regarding the speed of a load moving over the system. It would be further beneficial to provide a weighing system that allows insight into the loading of the container moving the load.

SUMMARY

In one embodiment a weigh-in-motion system uses multiple channels to provide increased detail regarding a load moving across the weigh-in-motion system. The weigh-in-motion system is used in some embodiments to identify a speed of the load as it moves across the scale. The weigh-in-motion system in some embodiments is configured to identify irregularities in the loading of a container such as a vehicle, carton, cart, etc.

A "leading edge" of a platform as that term is used herein is the edge of the platform at which a vehicle moves onto the platform. A "trailing edge" of a platform, as that term is used herein, is the edge of the platform at which a vehicle leaves the platform.

In one embodiment, a weigh-in-motion system includes a platform structure supported by and movable with respect to a base. The platform structure is supported at its leading edge by one or more first load cell assemblies, and supported at its trailing edge by one or more second load cell assemblies. Each load cell assembly generates respective data indicative of a load profile on the load cell assembly as a vehicle crosses the platform. A processor is configured to execute program instructions stored in a memory to obtain the data generated by the load cell assemblies and to determine a weight associated with the vehicle using the obtained data. An output is generated, in paper and/or electronic form, based upon the determined weight.

In one or more of the other embodiments disclosed herein a weigh-in-motion system is further configured to sum the obtained data and identify a plateau of the summed data. The weight associated with the vehicle is determined using the identified plateau.

In one or more of the other embodiments disclosed herein a weigh-in-motion system is further configured to identify a crossover point of the first load profile with the second load profile based upon the obtained data. The weight associated with the vehicle is determined using the identified crossover point.

In one or more of the other embodiments disclosed herein wherein a crossover is identified, a weigh-in-motion system is further configured to use the data to identify when a vehicle moves onto the platform structure and when the vehicle moves off the platform structure. By comparing any time difference between those two times and the crossover time to a threshold, unreliable weight determinations resulting from a variation in speed during weighing are identified.

In one or more of the other embodiments disclosed herein the weigh-in-motion system is further configured to identify at least one of a negative slope of the load profile associated with the leading edge load assembly cells using the respective data, and a positive slope of the load profile associated with the trailing edge load cell assemblies using the respective data. The system is further configured to determine that a speed of the vehicle is greater than a predetermined threshold using the identified at least one negative slope and positive slope. The system then identifies the determined weight as unreliable based upon the speed of the vehicle being determined to be greater than the predetermined speed threshold.

In one or more of the other embodiments disclosed herein the weigh-in-motion system is further configured to identify a maximum of the first load profile using the respective data, and identify a maximum of the second load profile using the respective data. The system then determines a window of significant data beginning with the first maximum and ending with the second maximum. A crossover point of the first load profile with the second load profile based upon the respective data within the window of significant data is then identified and the weight of the vehicle is determined by the processor using the identified crossover point.

In one or more of the other embodiments disclosed herein the weigh-in-motion system is further configured to compare the respective load profile data to stored profile data associated with the vehicle and generate an output based upon the comparison.

In one or more of the other embodiments disclosed herein the weigh-in-motion system further includes a second platform structure supported by the base and movable with respect to the base. The two platform structures are collinear and spaced as desired so that the left side wheels of the vehicle move over one of the platform structures while the right side wheels of the vehicle move over the other of the platform structures. The second platform is configured substantially identically to the first platform structure and supported with leading and trailing edge load cell assemblies which perform like the load cell assemblies associated with the first platform structure. The processor in these embodiments further uses the additional data from the second platform load cell assemblies to determine the weight of the vehicle.

In one or more of the other embodiments disclosed herein wherein a second platform is provided, the leading and trailing edge load cell assemblies are compared to verify that the load cell assemblies are functioning properly. The results of the comparison are used in generating the system output. By way of example, if one of the four (or more) load cell assemblies provides data which is significantly different from the other load cell assemblies, the one load cell assembly data is not incorporated into the various analyses described herein.

In one or more of the other embodiments disclosed herein wherein a second platform is provided, either a second crossover point is identified and analyzed using the load cell assemblies of the second platform structure or a single crossover point is identified and analyzed using averages of the leading load cell assemblies and of the trailing load cell assemblies.

In one or more of the other embodiments disclosed herein wherein a second platform is provided, the weigh-in-motion system is configured to compare the time at which a vehicle moves onto the two platforms using data from the leading edge load cell assemblies. If the time varies by more than a predetermined amount, the determined weight is unreliable because of the angle at which the vehicle crossed over the platforms.

In one or more of the other embodiments disclosed herein wherein a second platform is provided, the data from the second platform is averaged with the data from the first platform in performing the various analyses described herein.

In one embodiment, a method of operating a weigh-in-motion system includes moving at least one first wheel of a vehicle onto a first platform structure supported by a base and movable with respect to the base. The method includes generating, with at least one first load cell assembly supporting a leading edge of the first platform structure, first data associated with a first load profile of the at least one first load cell assembly as the vehicle moves across the first platform structure. The method further includes generating, with at least one second load cell assembly supporting a trailing edge of the first platform structure, second data associated with a second load profile of the at least one second load cell assembly as the vehicle moves across the first platform structure. A processor executes program instructions stored in a memory to obtain the generated first and second data and determine a weight associated with the vehicle using the obtained first and second data. An output is generated based upon the determined weight.

In one or more of the other embodiments disclosed herein, the method includes performing one or a combination of the analyses described herein.

In one or more of the other embodiments disclosed herein, the method includes moving at least one second wheel of the vehicle onto a second platform structure supported by the base and movable with respect to the base. The method further includes generating, with at least one third load cell assembly supporting a leading edge of the second platform structure, third data associated with a third load profile of the at least one third load cell assembly as the vehicle moves across the second platform structure. The method also includes generating, with at least one fourth load cell assembly supporting a trailing edge of the second platform structure, fourth data associated with a fourth load profile of the at least one fourth load cell assembly as the vehicle moves across the second platform structure. The method continues by executing the program instruction with the processor to obtain the generated third and fourth data, and determine the weight using the obtained third and fourth data.

DETAILED DESCRIPTION

Figure 2:
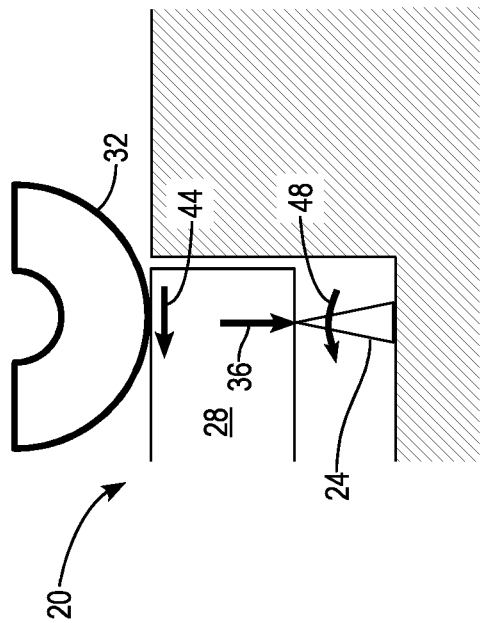
FIG. 2 is a partial side schematic cut away view of a tire moving across an active section of a prior art axle scale showing a moment produced about the supports of the active section.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Figure 3:
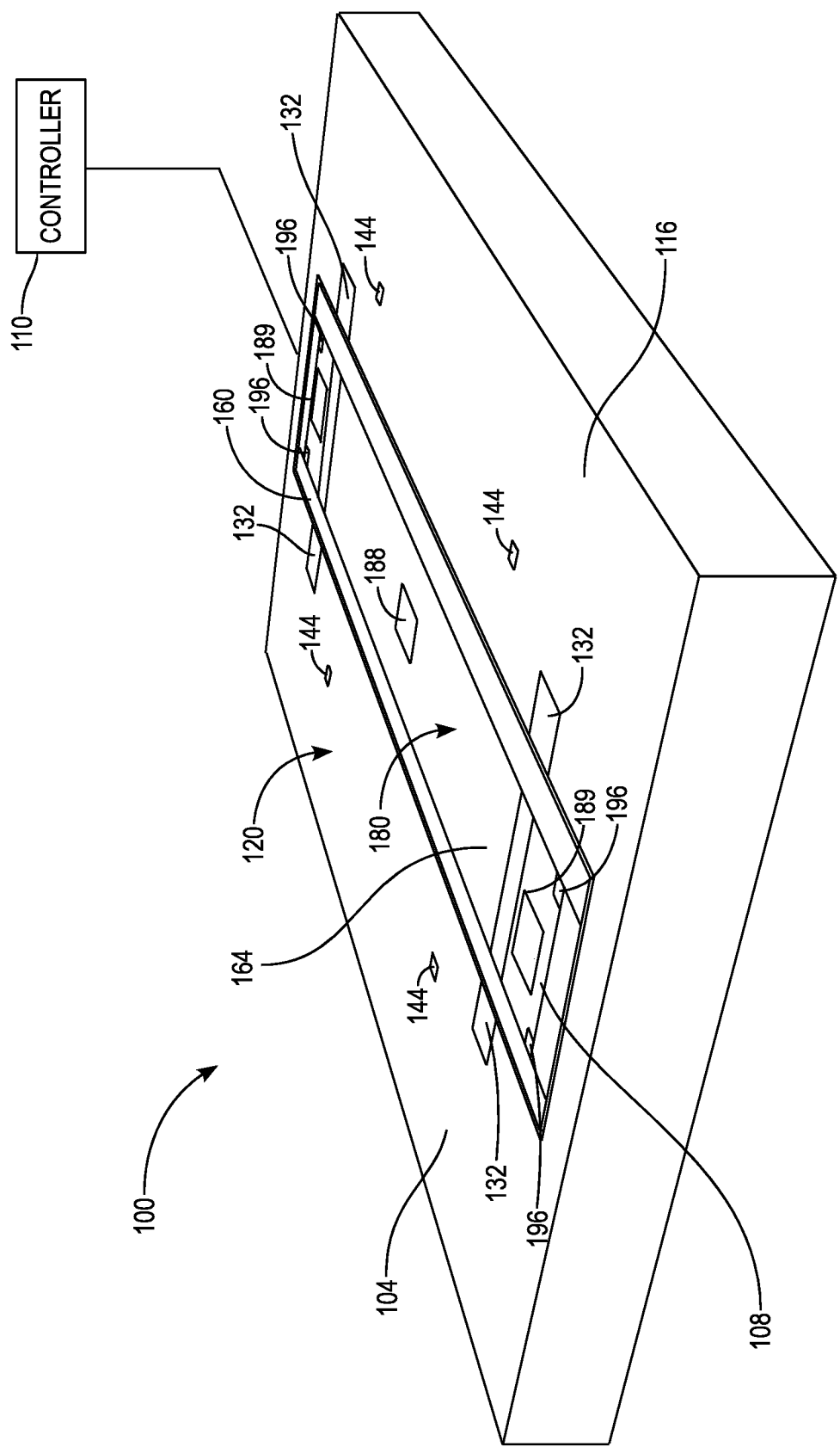
FIG. 3 is a side perspective view of a weigh-in-motion system.

FIG. 3 illustrates a perspective view of a weigh-in-motion system 100. The weigh-in-motion system 100 includes a base 104, a platform structure 108, and a controller 110.

Figure 4:
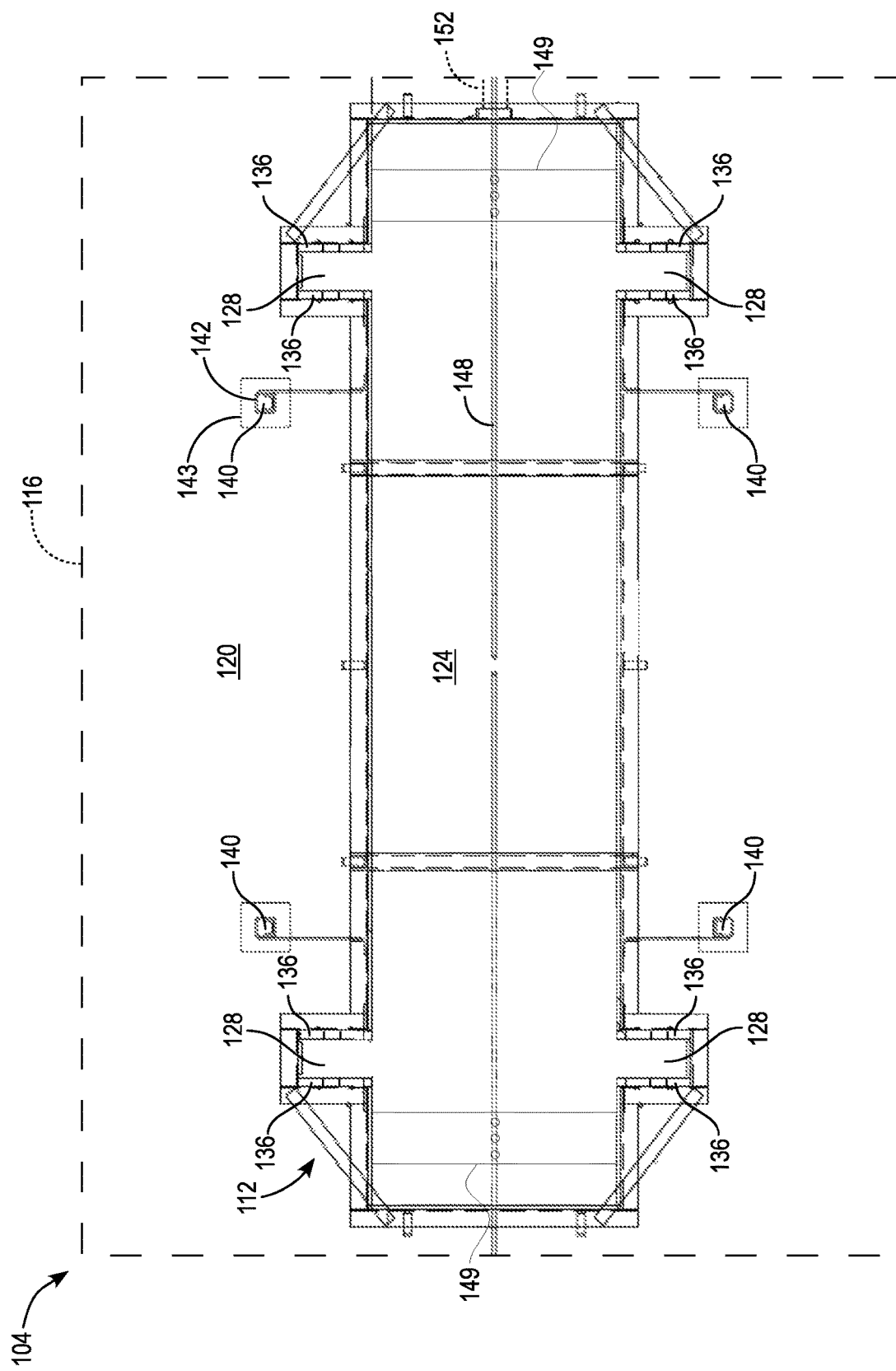
FIG. 4 is a top plan view of the base portion of the weigh-in-motion system of FIG. 3 showing the base frame located within the base portion and the platform structure removed for clarity.

With further reference to FIG. 4, which shows the weigh-in-motion system 100 with the platform structure 108 removed, in the illustrated embodiment, the base 104 is shaped substantially as a rectangular prism. In other embodiments, however, the base has a different shape, for example a trapezoidal, rounded, or irregular shape. The base 104 includes a base frame 112 and a concrete body 116 (shown in shadow in FIG. 4), which defines a generally flat upper surface 120 of the base 104.

The base frame 112 is surrounded by the concrete body 116 and defines a scale or platform opening 124. The base frame 112 is formed of structural steel, for example C-channel steel, webbed steel beams, or steel plates, welded together in the shape of a rectangle having four load cell openings 128 extending outwardly therefrom. Each load cell opening 128 opens laterally to the platform opening 124 and is covered by a removable load cell cover 132, which is substantially flush with the upper surface 120 of the concrete body 116. As will be described in greater detail below, each load cell opening 128 includes a support member pair, which in the illustrated embodiment is provided by two saddle members 136 affixed to the base frame 112, with one saddle member 136 on each lateral side of the load cell openings 128.

The base 104 has four lift members 140 positioned symmetrically about the vertical and horizontal axes of the base 104. Each of the lift members 140 is anchored in a well 142 in the concrete body 116 by support plates 143 embedded in the concrete body 116, and are accessed through a lift member covering plate 144 that is substantially coplanar with the upper surface 120 of the concrete body 116. Each lift member 140 includes an attachment member (not shown), for example one or more chain links, fixed in the well 142 to enable a lifting device, such as a forklift, a crane, or a backhoe, to attach to the lift members 140 with a chain or hook.

The base 104 further includes a cable conduit 148 embedded in the concrete body 116 beneath the platform opening 124. In the illustrated embodiment, the cable conduit 148 is one inch diameter PVC and extends along the longitudinal axis of the base portion, though in other embodiments other sizes and materials are used for the cable conduit 148 and the cable conduit 148 runs in a different orientation within the concrete body 116. The cable conduit 148 is configured to carry wires that connect components within the platform structure 108, such as load cells, to the controller 110. Two flexure bases 149 including a plurality of bolt holes are provided in the base 104. The bolts holes are substantially centered within the platform opening 124.

The base 104 also includes a drain aperture 152 (shown in shadow in FIG. 4) extending through the concrete body 116 at one end of the platform opening 124. The drain aperture 152 is located at or below a bottom surface of the platform opening 124 such that water and other liquids drain out of the platform opening 124 through the drain aperture 152.

Figure 5:
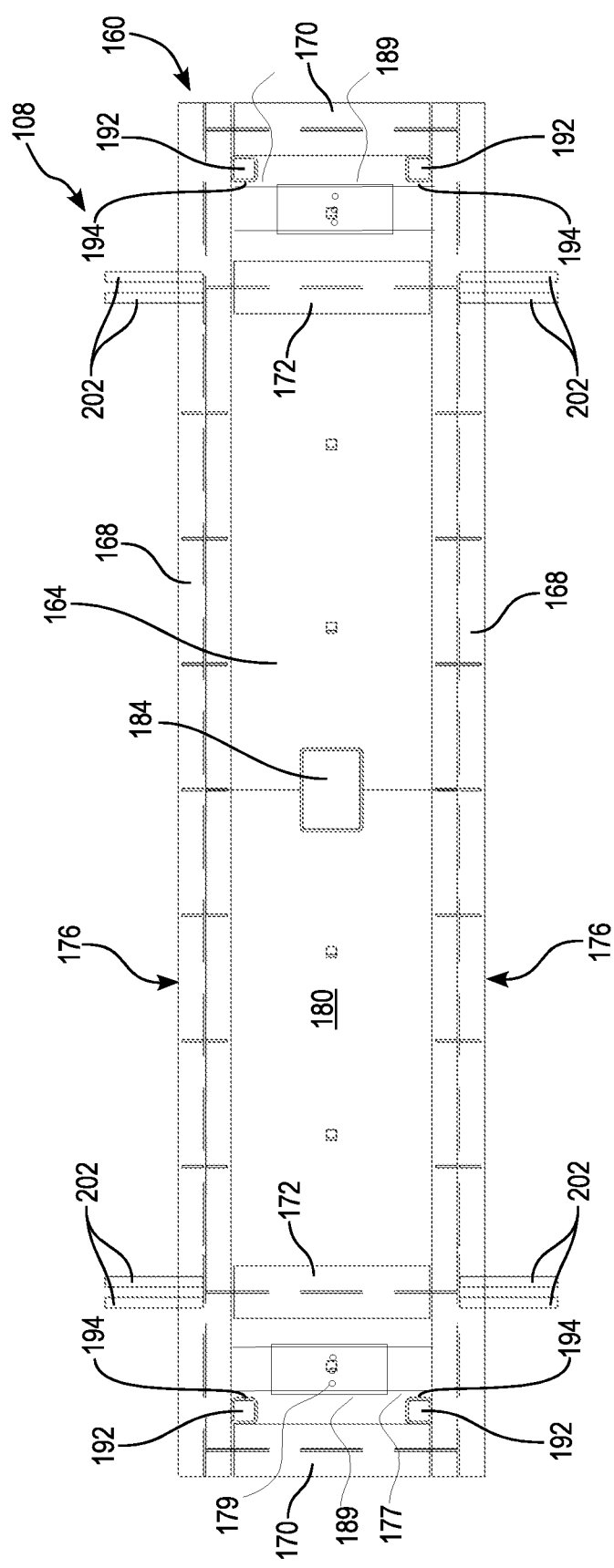
FIG. 5 is a top plan view of the platform structure of the weigh-in-motion system of FIG. 3.

Referring now to FIG. 5, which is a top plan view of the platform structure 108, with continuing reference to FIG. 3, the platform structure 108 includes a platform frame 160 surrounding an inner concrete body 164. The platform frame 160 includes steel beams 168, 170, and 172, which, in one embodiment are W5×19 steel beams, welded together. Two flexures 177 extend between the lower surfaces of the beams 168. In some embodiments a single flexure is provided while in other embodiments more than two are provided. In some embodiments, the flexures are positioned such that wheels of a vehicle pass directly above the flexures as the vehicle passes over the platform during a weighing operation. The flexures 177 are stainless steel plates of about 20-60 thousandths of an inch, and preferably about 30 thousandths of an inch. In one embodiment, the flexures 177 are about 7.5 inches in width and formed from a form of steel such as stainless steel, carbon steel, etc.

Figure 5A:
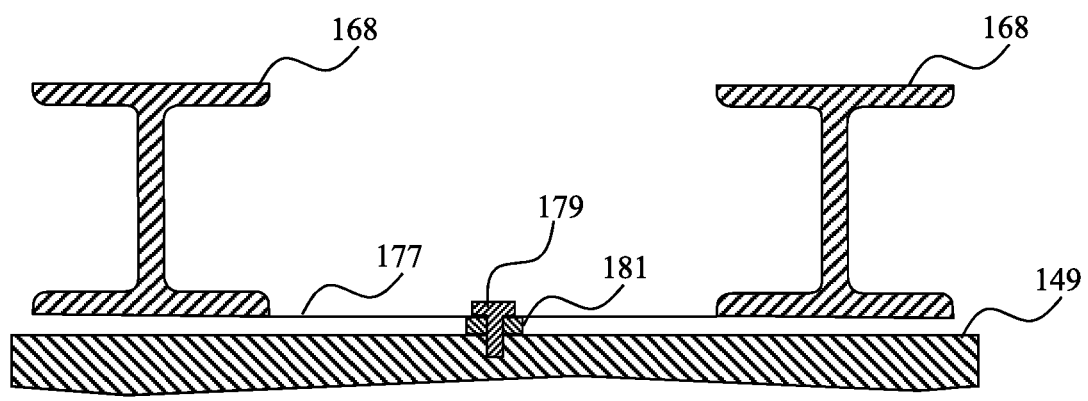
FIG. 5A depicts a simplified cross-sectional schematic view of a flexure plate extending between lower surfaces of the beams of the platform structure of FIG. 5.

Two flexure cover plates 189 cover flexure openings in the platform structure 108 and are removable to provide access to the flexures from above the platform structure 108 so that bolts 179 can be used to bolt the flexures 177 to the flexure bases 149. When fixedly connected to both the platform structure 108 and the flexure bases 149 as shown in FIG. 5A, the flexures 177 are preferably substantially planar, and parallel to a horizontal planar top surface 180 of the platform structure 108. To reduce any deflection of the flexures 177 out of this configuration, shims 181 may be positioned as necessary between the flexures 177 and the flexure bases 149.

The platform frame 160 defines a rectangular shape and is sized to fit within the platform opening 124 of the base 104 with a minimal clearance, which, in one embodiment, is approximately ½ inch on each side of the platform frame 160. The long steel beams 168 define outer edges 176, which are substantially aligned with the long edges of the platform opening 124 when the platform structure 108 is installed in the platform opening 124.

Figure 1:
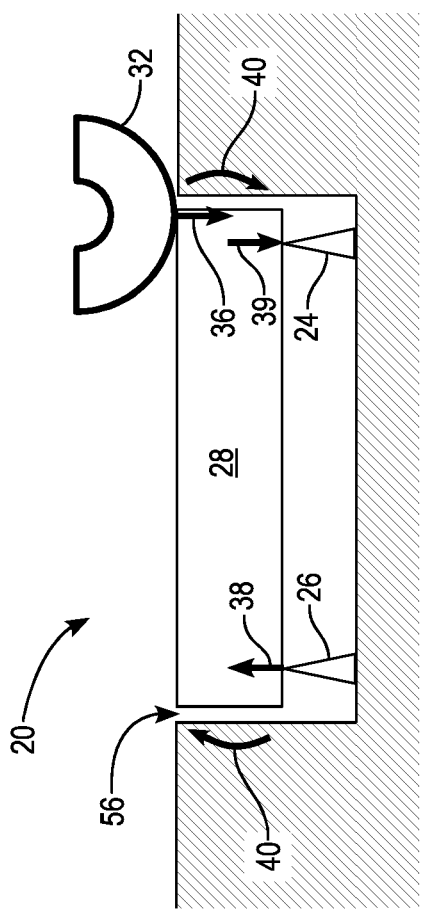
FIG. 1 is a side schematic cut away view of a tire on an active section of a prior art axle scale showing a tipping moment produced on the active section.

The top surface of the inner concrete body 164, along with the top surface of the steel beams 168, 170, 172 define a horizontal planar top surface 180 of the platform structure 108, which is substantially coplanar with the upper surface 120 of the base 104. An opening 184 is defined in the inner concrete body 164 to enable maintenance and connection of wires within the platform structure 108. In some embodiments, an electronic module (not shown) is located within the opening 184 to facilitate connection of the wires in the platform structure 108. The opening 184 is covered by an opening cover plate 188 (FIG. 1), which has a surface that is substantially coplanar with the top surface 180 of the platform structure 108.

Four anchor points 192 are embedded in wells 194 in the inner concrete body 164 and are attached to the outer steel beams 168, 170 at each inside corner of the outer steel beams 168, 170. The anchor points 192 are functionally the same as the lift members 140 of the base 104, and each anchor point 192 is accessed through an anchor plate 196 configured to be flush with the top surface 180 of the platform structure 108. Each anchor point 192 further includes an attachment member (not shown), for example one or more chain links, fixed in the anchor point 192 to enable a lifting device, such as a forklift, a crane, or a backhoe, to attach to the anchor point 192 with a chain or hook.

Figure 6:
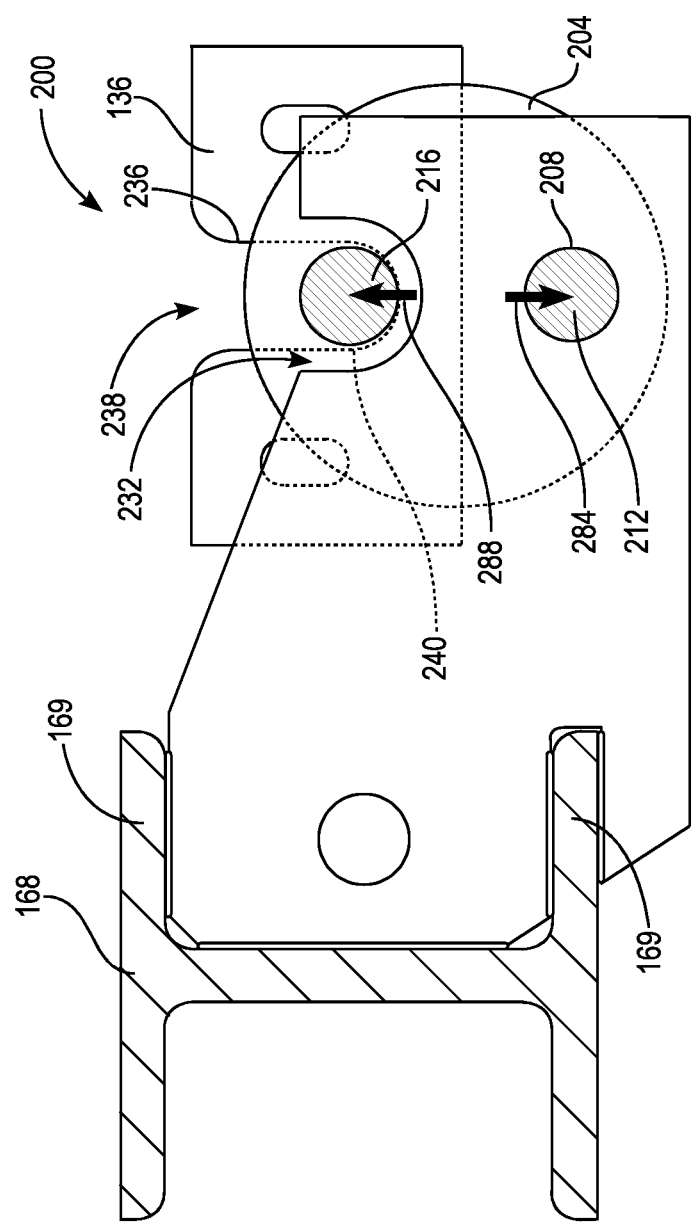
FIG. 6 is a partial side cross-sectional view through the connecting assembly of the weigh-in-motion system of FIG. 3 showing the connecting plate, the load cell, and the saddle member.
Figure 7:
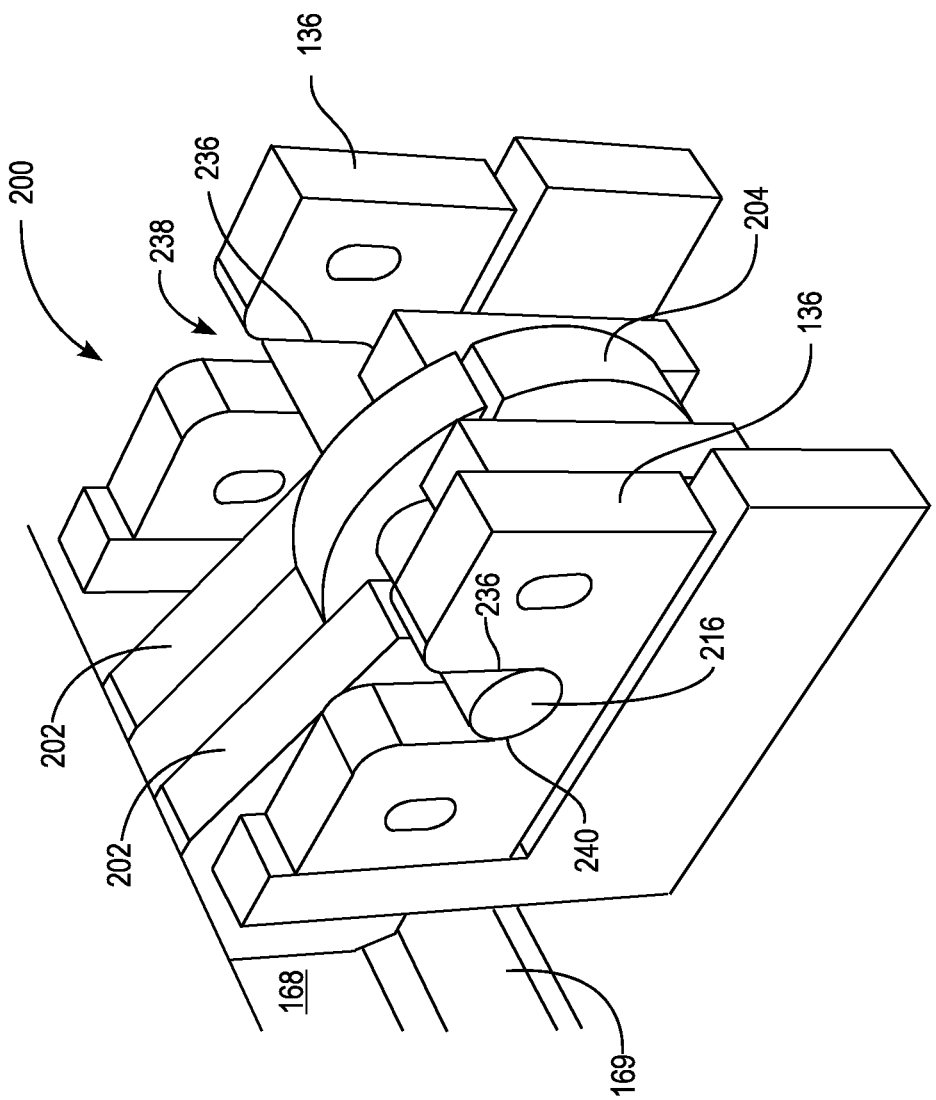
FIG. 7 is a side perspective view of the connecting assembly of FIG. 6, with the base removed for clarity.
Figure 8:
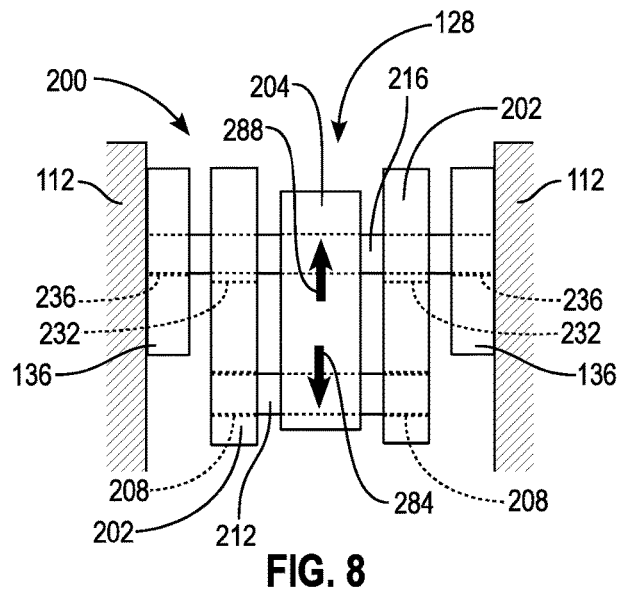
FIG. 8 is a front cross-sectional view of the connecting assembly of FIG. 6.
Figure 9:
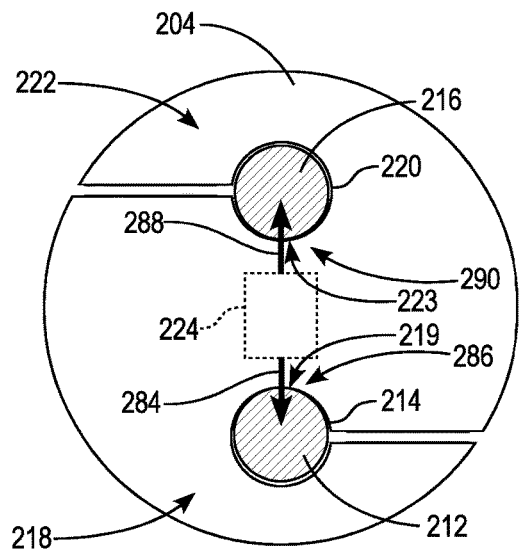
FIG. 9 is a side view of the load cell assembly of the weigh-in-motion system of FIG. 3.

The platform structure 108 is supported by four connecting assemblies 200, which are illustrated in FIGS. 6-8, each of which is positioned in one of the load cell openings 128 when assembled. The connecting assemblies 200 each include two connecting plates 202, a load cell assembly 204, a load pin 212, a fulcrum pin 216, and the pair of saddle members 136. Each pair of connecting plates 202 supports the load cell assembly 204. Each of the connecting plates 202 has a first end shaped to fit vertically between the flanges 169 of steel beam 168, and the first end is welded securely to the flanges 169 and the web of the steel beam 168. Opposite the first end, the connecting plates 202 include load pin apertures 208, which support the ends of the load pin 212.

As is illustrated in FIGS. 6-9, the load pin 212 extends between the connecting plates 202 through a load pin opening 214 in a lower portion 218 of the load cell assembly 204. The load pin opening 214 is chamfered, having a lesser diameter at the top than at the bottom of the load pin opening 214. The load pin 212 thus rests at the top of the load pin opening 214, against a bearing surface 219 in the load cell assembly 204. The fulcrum pin 216 extends between the saddle members 136 through a fulcrum pin opening 220 in an upper portion 222 of the load cell assembly 204, above the load pin 212. The fulcrum pin opening 220 is also chamfered, having a lesser diameter at the bottom than at the top of the fulcrum pin opening 220. The fulcrum pin 216 thus rests at the bottom of the fulcrum pin opening 220, against a bearing surface 223. Since the load pin 212 and the fulcrum pin 216 are supported against the bearing surfaces 219, 223, respectively, the load cell assembly 204 is pivotable relative to the platform structure 108 and the base 104 and, in particular, the load pin 212 rotates about the fulcrum pin 216. Each of the load pin 212 and the fulcrum pin 216 is operably connected to a strain sensing component 224 of the load cell assembly 204. In one embodiment, the load cell assembly 204 is a model T95 shear beam load cell sold by Thames-Side Sensors Limited, though other desired load cell assemblies are used in other embodiments.

The fulcrum pin 216 extends through a fulcrum pin opening 232 in the connecting plates 202 without contacting either of the connecting plates 202. The saddle members 136 include saddle grooves 236 having a tapered "U"-shape with upwardly opening mouth portions 238 and closed lower portions 240. In some embodiments, one or more of the saddle grooves 236 have a "V"-shape or a trapezoidal shape, and in some embodiments the saddle grooves 236 of the saddle members 136 are shaped differently from the opposing saddle member 136. As is best shown in FIGS. 6 and 7, the ends of the fulcrum pin 216 rest in the closed lower portion 240 of the saddle groove 236 of the saddle member 136.

Figure 10:
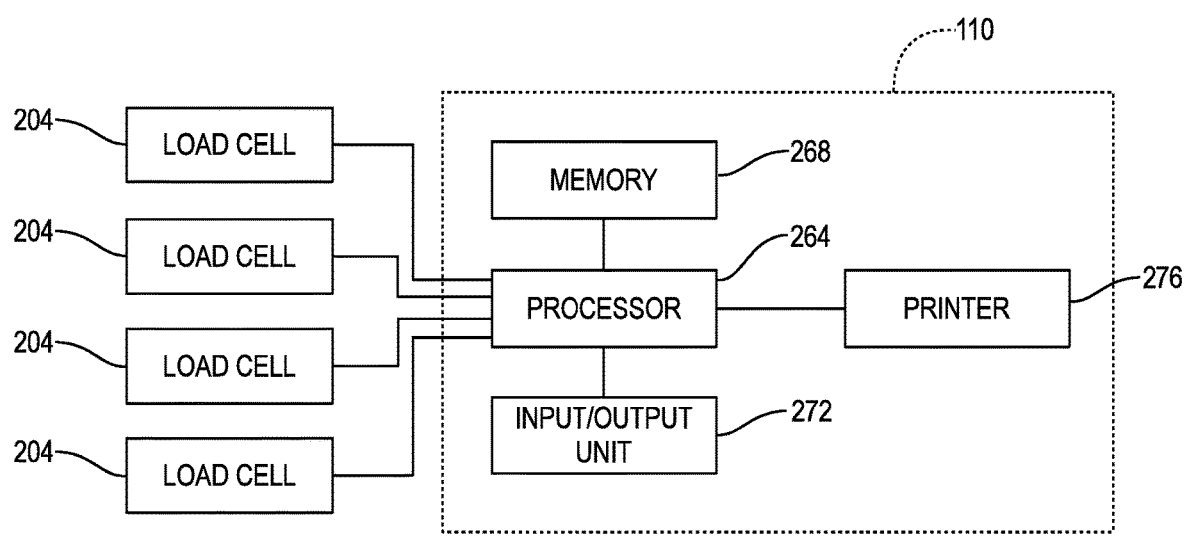
FIG. 10 is a schematic diagram of the load cells and controller of the weigh-in-motion system of FIG. 3.
Figure 11:
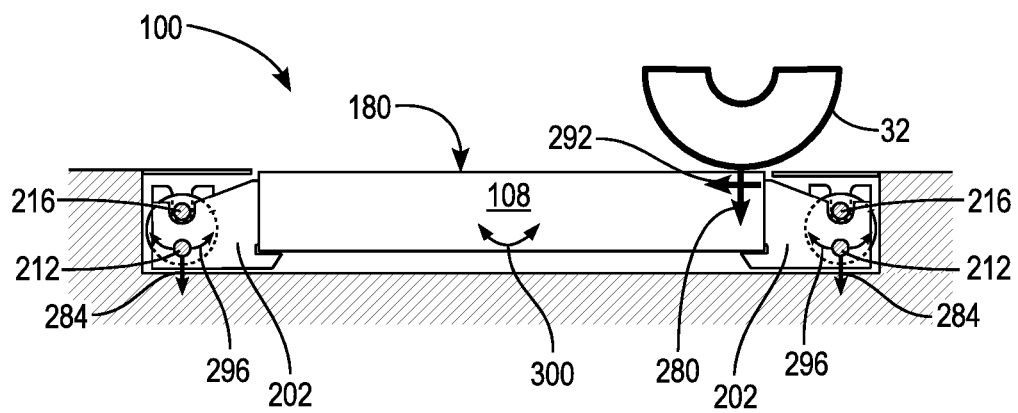
FIG. 11 is a side schematic view of a tire moving across the weigh-in-motion system of FIG. 1.
Figure 12:
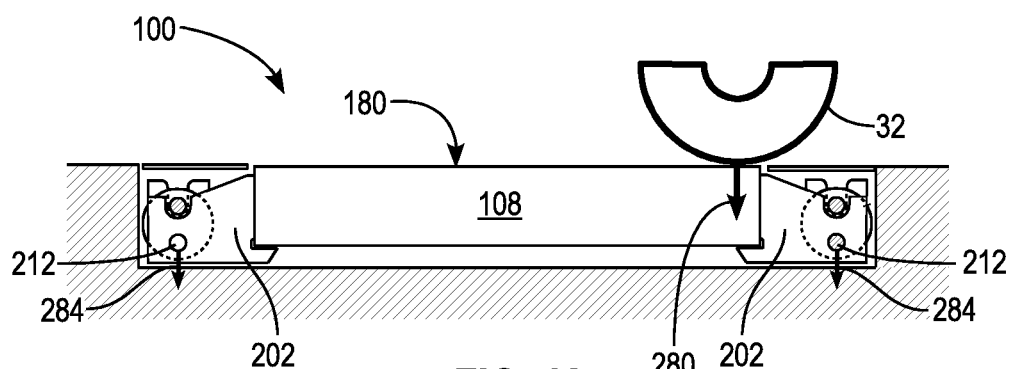
FIG. 12 is a side schematic view of a tire moving onto the weigh-in-motion system of FIG. 1.

FIG. 10 is a schematic diagram of the controller 110 of the weigh-in-motion system 100 and the components communicating with the controller 110 in the weigh-in-motion system 100. Operation and control of the various components and functions of the weigh-in-motion system 100 are performed with the aid of the controller 110. The controller 110 is implemented with a general or specialized programmable processor 264 that executes programmed instructions. In some embodiments, the controller includes more than one general or specialized programmable processor. The instructions and data required to perform the programmed functions are stored in a memory unit 268 associated with the controller 110. The processor 264, memory 268, and interface circuitry configure the controller 110 to perform the functions described above and the processes described below. These components are provided in some embodiments partially or entirely on a printed circuit card or provided as a circuit in an application specific integrated circuit (ASIC). Each of the circuits in some embodiments is implemented with a separate processor or multiple circuits are implemented on the same processor. Alternatively, the circuits can be implemented with discrete components or circuits provided in VLSI circuits. Also, the circuits described herein are implemented in some embodiments with a combination of processors, ASICs, discrete components, or VLSI circuits.

The processor 264 is operably connected to and configured to obtain the load signals generated by the load cells 204, and the load signals obtained by the processor 264 are stored in the memory 268 of the controller 110. The controller 110 further includes an input/output device 272 operably connected to the processor 264 to enable a user to input parameters and activate operating algorithms for the processor 264, and to enable the controller 110 to display information to the user of the weigh-in-motion system 100. The processor 264 is also operably connected to a printer 276, and is configured to transmit electronic signals to the printer 276 to operate the printer to print a receipt indicating the axle loads determined by the processor 264. In the illustrated embodiment, the processor 264, the memory 268, the input/output unit 272, and the printer 276 are all contained within a common housing of the controller 110, which is installed proximate to the base 104 and platform structure 108 of the weigh-in-motion system 100. In other embodiments, one or more of the control components, for example the printer 276, are located remote from the common housing of the controller 110.

When the weigh-in-motion system 100 is initially configured, a target speed is selected for the system based upon a variety of factors. For example, the response time from the load cell assemblies 204 establish a maximum allowed speed for a given desired accuracy. The response time is a function of the particular load cell as well as the weight which is supported by the load cell assemblies.

Speeds higher than the target speed will generate increased error margins, while speeds below the target speed will simply reduce the volume of traffic. For some systems located at vehicle depots, warehouses, etc., when the container is in the form of a vehicle, a target speed of 15 miles per hour or less is established. For some systems located adjacent a highway, a significantly higher target speed of 30-60 miles per hour is generally desired. Once a target speed is identified for a particular embodiment/load cell, the controller 110 is configured with a desired sampling rate of the load cells to provide sufficient data for the desired accuracy as is discussed in further detail below.

To operate the weigh-in-motion system 100, a user activates a command on the input/output unit 272 of the controller 110 of the weigh-in-motion system 100 indicating that a load is to be measured. For the embodiment of FIG. 3, the load is associated with a vehicle that is to be moved over the platform structure 108. In some embodiments, the user activates the command remotely via, for example, Wi-Fi, Bluetooth, infrared, or another desired wireless transmission. In yet another embodiment, the controller 110 is configured to automatically register the presence of the vehicle and autonomously activates the command using, for example, a radio frequency identification ("RFID") tag on the vehicle. In further embodiments, the ready command is automatically activated by the controller 110 upon detection of a predetermined weight on the platform structure 108, indicating that a weighing operation is commencing.

In any event, as illustrated in FIGS. 6, 9, 11, and 12, as the vehicle moves toward the platform structure 108, the wheels 32 of each axle first pass onto the upper surface 120 of the base 104. The wheels of the axle subsequently pass onto the top surface 180 of the platform structure 108. In one embodiment, the base 104 is sized such that, for a semi-truck having tandem axles, the wheels of both tandem axles are on the upper surface 120 of the base 104 prior to the wheels of the leading axle moving onto the top surface 180 of the platform structure 108. This provides a stable base for the wheels of the tandem axle that is not on the platform structure 108 while the other axle is being weighed by the platform structure 108.

As the wheels pass onto the top surface 180 of the platform structure 108, the flexures 177 inhibit movement of the platform structure 108 within the opening 124. Specifically, the half of the flexure 177 which is subjected to tension along the horizontal plane resists movement along the horizontal plane. Accordingly, in some embodiments wherein vehicles move only in a single direction, the flexures are connected to the platform structure only at a location proximate the location at which the vehicle moves onto the platform.

Additionally, the force 280 from the wheels 32 acts downwardly on the steel beams 168, 170, 172 and the inner concrete body 164. The downward force from the steel beams 168 is transferred to the connecting plates 202, which subsequently apply downward load force components 284 to the load pins 212 at a lower load transfer area 286. In response to the downward load force components 284, the fulcrum pins 216 are subjected to an upward reaction force 288 from the saddle groove 236, which is also imparted on the load cell assembly 204 at upper load transfer area 290.

Each load cell assembly 204 is configured to periodically generate an electronic signal indicative of the tension force between the load pin 212 and the fulcrum pin 216 as measured by the strain sensing component 224. In one embodiment, the load cell assembly 204 is configured to generate the electronic signal at 100 Hz, though in other embodiments alternative sampling rates are used. The processor 264 receives the electronic signals from the load cell assemblies 204 and stores the data in memory 268. The same process above occurs in other embodiments including those wherein the load that is measured is moved over the platform by other conveyances e.g., a conveyor belt, a rail system, etc.

Figure 13:
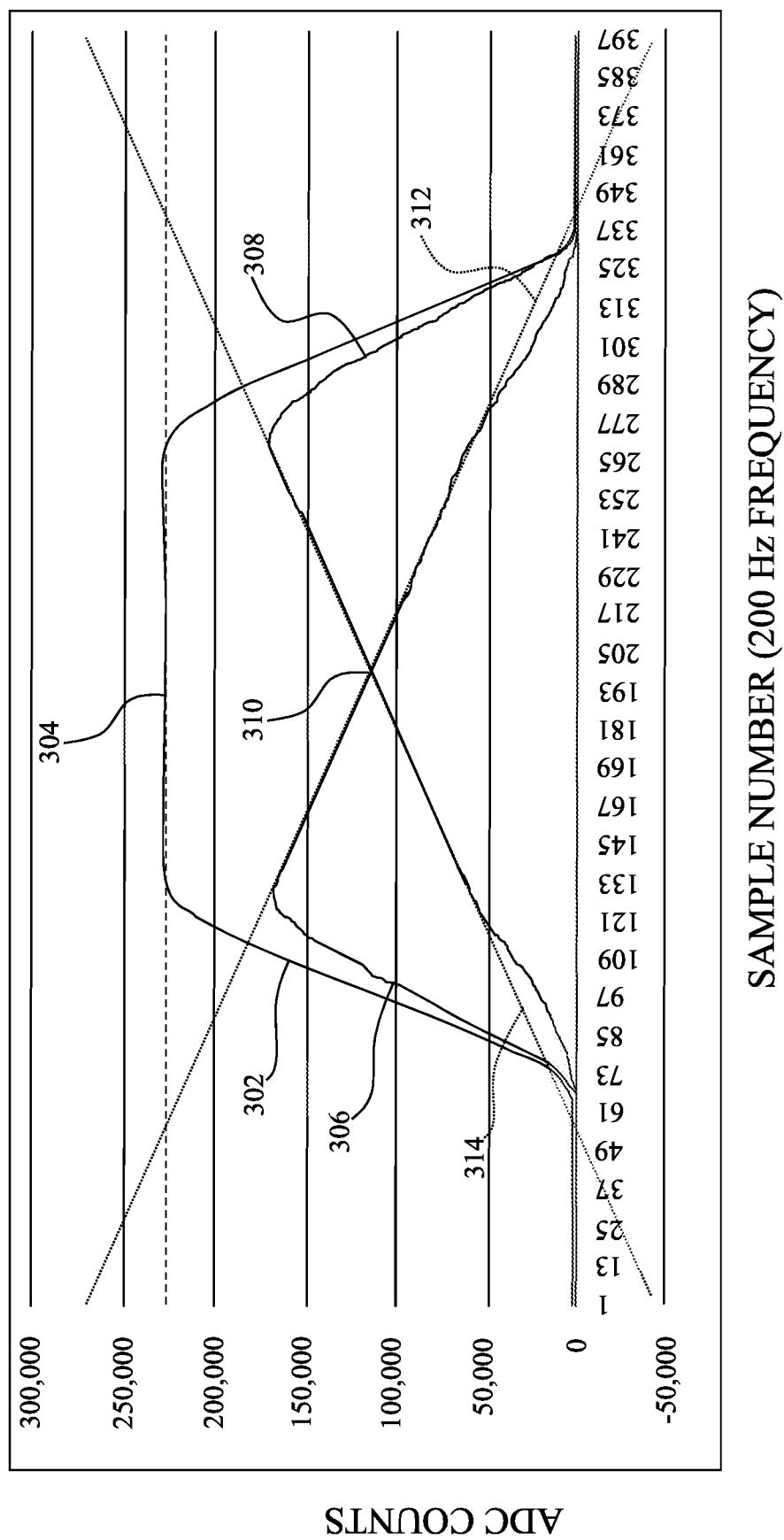
FIG. 13 is a graph showing the load cell readings for a vehicle axle passing over a load cell assembly of the weigh-in-motion system of FIG. 1.

FIG. 13 illustrates a graph 300 of load values for an exemplary vehicle driving over the platform 108 for a system including four load cell assemblies, although in other embodiments as few as 2 or more than four are used. So long as at least one load cell assembly is provided for each of the leading edge (edge at which vehicle moves onto the platform 108) and trailing edge (edge at which vehicle leaves the platform 108) of the platform 108, two channels of data (e.g., leading channel and trailing channel) can be obtained which allows for a "signature" to be identified by the processor 264. For example, a single load cell assembly on each of the leading and trailing edge along with pivots to support the platform corners without load cells enables a two channel configuration. Additional channels/load cell assemblies are incorporated in some embodiments to improve accuracy and error detection.

As discussed in further detail below, comparison of the signature waveform between the channels identifies potential measurement inaccuracies. The relationship between the channels can then be exploited.

In FIG. 13, a typical vehicular signature for a two channel (leading channel/trailing channel) is depicted. The line 302, which in some embodiments is omitted, represents the analog to digital converter (ADC) counts obtained by the processor 264 from each of the four load cell assemblies 204 and added together. Each "count" in this embodiment is approximately 0.5 pounds. The ADCs in this embodiment are sampled at a frequency of 200 Hz, providing a sample every 5 msec. The plateau 304 is achieved when the wheel 32 is fully supported by the four load cell assemblies 204 and represents the full weight applied to the platform 108. While depicted as a graph, the data in some embodiments is provided through the input/output device 272 as a data set which in some embodiments is a single weight value.

In addition to, or as an alternative to, the value associated with the line 302, the processor 264 is configured to generate leading channel data 306 and a trailing channel data 308. The leading channel data 306 is an average of the data obtained by the processor 264 from (in this embodiment) the two load cell assemblies 204 located closest to the side of the platform at which the vehicle 32 moves onto the platform 108 (the leading load cell assemblies). The trailing channel data 308 is an average of the data obtained by the processor 264 from the two load cell assemblies 204 located closest to the side of the platform from which the vehicle 32 exits the platform 108 (the trailing load assemblies). The leading and trailing channel data 306/308 are used to provide additional insight into the manner in which the measurement was obtained.

As an initial matter, the leading channel data 308 is readily identified even without prior knowledge of the orientation of the platform 108 since the leading edge load cell assemblies will initially receive the majority of the load. Accordingly, the signature shown in FIG. 13 which includes the profile data from at least one leading edge load cell and at least one trailing edge load cell, and which in some embodiments further includes a summation of the two profiles, is used in some embodiments to identify the direction of travel.

Additionally, configuration knowledge of the physical placement of the load cell assemblies for a particular embodiment enables determination of the axle weight. Different load cell geometries require different analyses. Nonetheless, so long as the geometry of the implementation is known for each implementation, the weight can be determined based upon the geometry.

With respect to the geometry of the embodiment described above, since the same dynamic load is eventually applied to both the leading and trailing load cell assemblies, the leading/trailing channels are essentially simply time shifted and reversed. Thus, under normal circumstances the leading and trailing channel data 306/308 intersect at a crossover 310. The crossover 310 is associated with the moment at which the load is centered between the leading and trailing load assemblies. Thus, by doubling the value of the two channels (306 and 308) at the crossover 310 the total weight of the vehicle which is on the platform 108 can be determined.

Moreover, the crossover 310 provides an indication as to whether the vehicle is travelling at a constant speed. Specifically, a constant speed is indicated when the time from peak weight detected by the leading channel to the crossover 310 is the same as the time from the crossover 310 to the peak weight detected by the trailing channel. If the vehicle is speeding up, then the crossover 310 will be positioned closer to the time at which the peak weight is detected by the trailing channel, and if the vehicle is slowing down then the crossover 310 will be positioned closer to the time at which the peak weight is detected by the leading channel.

Moreover, the slopes of the leading and trailing channel data 306/308 are direct functions of the speed of the vehicle given that the sampling rate does not change, the actual weight on the platform does not change (once the wheels 32 are fully on the platform 108) and the distance between the load cells does not change. As a result, speed is a function of axle weight and can be determined at the same accuracy as the weight. This provides an independent manner of measuring speed of a rolling vehicle. Accordingly, in some embodiments the processor 264 uses a linear regression technique to identify best-fit slopes for the leg of data of each channel that passes through the crossover 310. The line 312 is a best-fit slope for the leading load cell assemblies 204 (leading channel) while the line 314 is a best-fit slope for the trailing load cell assemblies 204 (trailing channel).

In one embodiment, the processor 264 determines a Pearson's coefficient for correlation and simple regression. In particular for $Y=b_0+b_{1 \cdot X}$ the following equations are used:

$$r = \frac{\sum Z_x Z_y}{n-1}$$

$$b_1 = r \cdot \frac{S_y}{S_x}$$

$$b_0 = \overline{Y} - b_1 \cdot \overline{X}$$

Given that the X-axis is driven by an ADC sampling rate which is time based, crystal locked and accurate (at least in terms of measurement variability associated in the Y-axis) it can be assumed that the error is all in the Y-axis data. Accordingly, in some embodiments the algorithms only correct for Y-axis error, thereby simplifying the calculations. In other embodiments, algorithms which correct for both X-axis and Y-axis sources of error are used.

Accordingly, the shape and overall characteristics of the channel data forms a "Digital Signature". Since both channels of data are sampled at the same time there is an inherent link between the digital signatures. Thus, any action by, e.g., a driver or operator, to attempt to disrupt the measurement process results in one or both of the data channels showing an atypical shape that is a mismatch with the digital signature. Such data is rejected as inaccurate.

In some applications, the waveform of each axle in a particular vehicle is captured and normalized for future comparison. This is particularly useful for applications where a fleet of vehicles are used. The normalized signature in these embodiments is used to further improve accuracy of the system and to detect measurement anomalies (e.g., worn suspension, flat tires, driver behavior, uneven engine idle, etc.) on a vehicle. The digital signature can further be used to verify that a vehicle is loaded safely. Specifically, by comparing the signatures of the different axles the load center of the vehicle can be identified. Additionally, by comparing the signature at the beginning and end of travel, a user can verify that the load did not change during the travel (e.g., leakage detection).

In addition to using the channel data to provide information regarding the manner in which the weight measurement was obtained, comparisons of the waveform from each channel allows for identification of faulty load cells/electronics in addition to erratic driver behavior that could compromise the weight reading. In the event a faulty load cell assembly is detected, the processor 264 in some embodiments is configured to autonomously isolate the load cell assembly data from the channel to provide some functionality for the system until such time as the faulty load cell assembly can be recalibrated, repaired, replaced, etc. Determination of the faulty load cell assembly is readily accomplished by comparing the individual data from each of the load cell assemblies.

Figure 14:
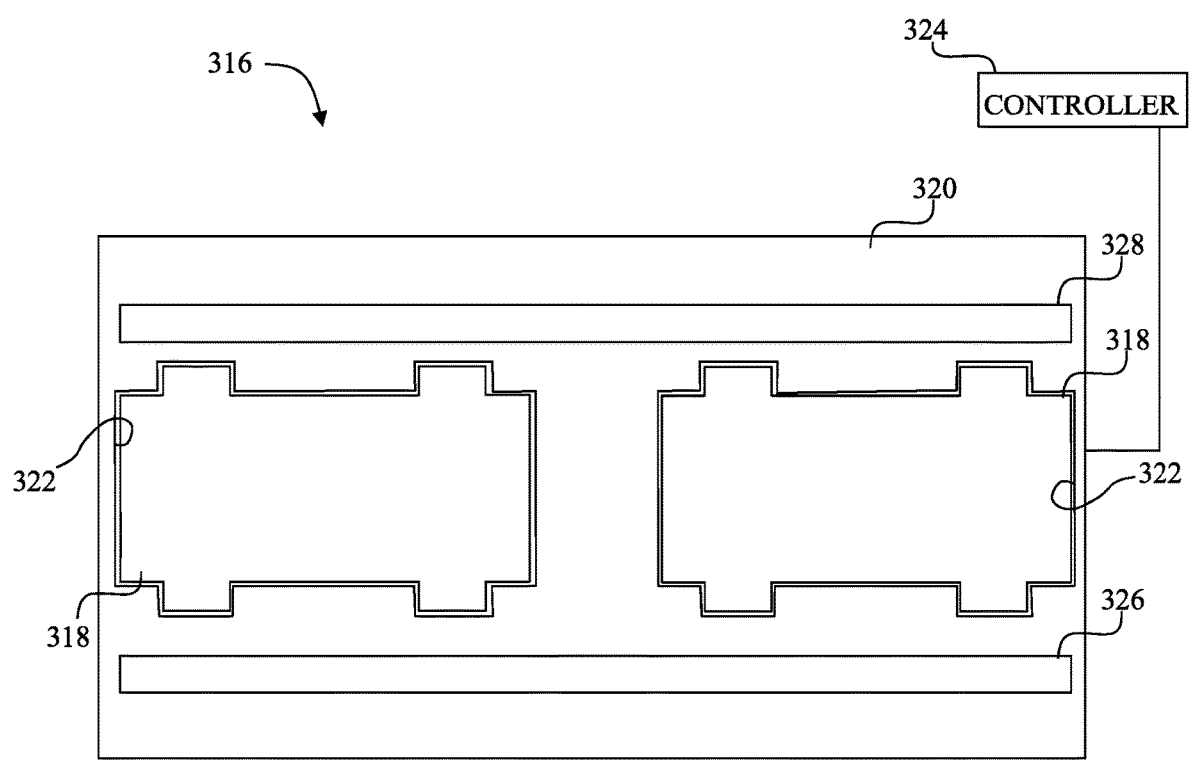
FIG. 14 is a top plan view of a weigh-in-motion system incorporating side by side platform structures.

While described with respect to a single deck or platform 108, digital signatures are be used in other configurations. In some embodiments, multiple decks are combined. By way of example, FIG. 14 depicts a weigh-in-motion system 316 which includes two platforms structures 318 supported by a base 320. The base 320 is substantially the same as the base 104 except that the base 320 includes two platform openings 322. The platform structures 318 are constructed like the platform structure 108 with the exception that the platform structures 318 are sized to support only the wheel/wheels on a single side of the vehicle. In embodiments incorporating two side by side decks like the weigh-in-motion system 316, the left/right balance or wheel loading can be ascertained by the controller 324, which in some embodiments is otherwise configured like the controller 110, rather than just axle loading. Additionally, for larger vehicles, wider decks are provided with additional load cell assemblies and/or channels to support the load.

Of course, since the data from each of the load cells assemblies is individually provided to the processor 264, additional data manipulation is possible. For example, the data in some embodiments is further divided into left side and right side data. Thus, the left leading load assembly data is compared to the left trailing load assembly data. If the data is not simply time shifted and reversed, then one of the load cell assemblies may be faulty. Moreover, if more weight is borne by the left side load cells than the right side load cells but the vehicle is centered on the platform 108 as it crosses the platform 108, then the load on the vehicle is not centered. Additional sensors are provided in some embodiments to verify the "left-right" position of the vehicle as it crosses the platform 108. By way of example, sensors like the sensors 326 and/or 328 of FIG. 14 may be provided. The sensors 326/328 in different embodiments are pressure sensors, optical sensors, etc. and may be remotely located from the base 320. In some embodiments, the sensors 326/328 are configured as arrays of sensors.

Figure 15:
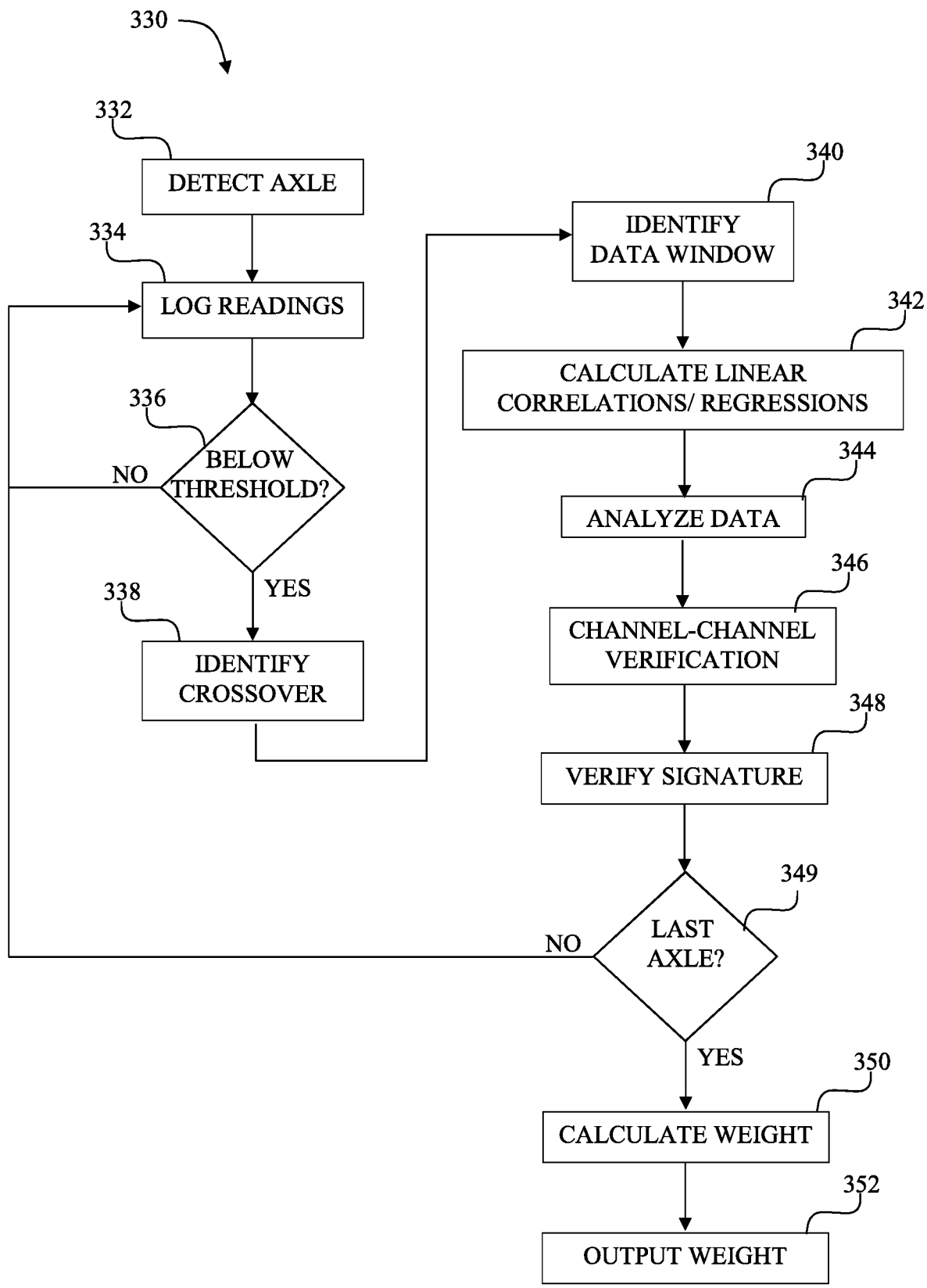
FIG. 15 is a process diagram of a method of operating a weigh-in-motion system.

In one embodiment, the processor 264 executes program instructions stored in the memory unit 268 to perform the method 330 of FIG. 15. While presented in a selected order, in some embodiments the order of the method is modified. Moreover, in some embodiments some of the actions described below are omitted. In some embodiments, additional functions are included. In any event, at block 332, the processor 264 evaluates data received from the load cell assemblies 204. If a load greater than the nominal weight of the platform 108 is observed, then the processor 264 identifies a "detection of an axle", i.e., that a wheel 32 has at least partially moved onto the platform 108. In another embodiment, the input is received directly at an input/output unit of the controller, while in other embodiments the input is transmitted wirelessly by a remote using Wi-Fi, Bluetooth, or infrared, or automatically received from a wireless device, for example an RFID tag on the vehicle.

Upon detection of an axle, at block 334 the processor 264 begins logging data from the load cell assemblies 204. In one embodiment, the processor sends commands to the load cells to activate the load cells to generate the load signals, while in another embodiment the load cells are configured to transmit the load signals autonomously in response to a load being detected or the load cells are configured to constantly transmit load signals. In yet another embodiment, the load cells continuously generate load signals, and the processor retrieves the load signals as needed. In any event, if the logged data is not below a predetermined threshold at block 336, logging of data continues at block 334. Once the logged data is below the threshold at block 336, the method proceeds to block 338. The threshold in some embodiments is for each load cell assembly to be below a predetermined value. In some embodiments, the threshold is for a sum of the output from the load cell assemblies to be below a predetermined value.

At block 338, the logged data is analyzed by the processor to identify the crossover point at block 338. At block 340 the data from each channel is further analyzed to identify the maximum output from each channel. This data, along with the identified crossover point, is used to establish a window of significant data. Specifically, during the initial increase in output of the load cell assemblies, and during the final decrease in output, the wheel is not fully on the platform 108. Accordingly, this data (which is observed in FIG. 13 as non-linear portions of the trailing channel 308 at around 85 msec and the leading channel 306 at about 313 msec) does not reflect the full weight on the wheel 32.

Once the window of significant data is identified, the processor 264 at block 342 calculates the linear correlations and regressions for each channel. Using the linear equations for each channel the data is analyzed to determine the speed of the vehicle (slope of the leading channel data 306 and the trailing channel data 308), the direction of travel (which channel peaks first), and an initial weight calculation based upon doubling of the value of the crossover point 310. (Block 344).

At block 346 the processor 264 performs various verification checks on the obtained and derived data. By comparing the linear correlations and regressions for each channel along with the derived data for each channel, variations between the channels can be identified. Accordingly, the processor 264 compares any difference in the calculated speed and/or correlation of the channels to a threshold which in some embodiments is stored in the memory 268. If the difference in calculated speed or correlation exceeds the threshold, a warning is generated on the input/output device 272 indicating that there is unacceptable measurement uncertainty. If such a message is generated, the result is typically rejected and the driver instructed to repeat the weighment.

At block 348 the processor 264 checks for a normalized signature waveform in the memory 268 for the particular vehicle. If a significant variation between the normalized signature waveform and the obtained signature waveform is identified, then a warning is generated on the input/output device 272 indicating that there is unacceptable measurement uncertainty. The appropriate normalized signature waveform is determined in some embodiments based upon an identification of the particular vehicle through the input/output device 272.

Once the logged data has been analyzed, one or more of the vehicle identification, direction of travel and speed parameters are used determine appropriate calibration factors to use to convert the readings into final weight values to be sent to the input/output device 272. The appropriate calibration forms in one embodiment are stored in the memory, e.g., in the form of lookup tables.

If there are additional axles to pass over the scale then the process continues at block 332. If all the axles have passed over the scale, then the processor proceeds to calculate the total vehicle load (block 350) by summing the individual axle loads stored in the memory at block 350. The processor then displays the individual axle loads and the total vehicle load (block 352). In one embodiment, the loads are displayed on a screen of the input/output unit of the controller and printed onto a receipt using a printer, while in other embodiments the loads are ether displayed on the screen or printed onto a receipt. In some embodiments, the axle and total loads are stored in the memory, while in other embodiments the axle and total loads are transmitted to an external device, such as a computer or a smartphone, via, for example, a serial, Ethernet, Wi-Fi, or Bluetooth connection. In further embodiments, the axle and load data is stored in "the cloud" and printed remotely of the axle scale. In some embodiments, the processor is further configured to recall a vehicle load from a previous pass over the scale by the same vehicle, and determine the net load of the vehicle by subtracting the stored load in the previous pass from the total load determined at block 352.

Although the disclosed weigh-in-motion system is described with reference to a system incorporating an axle scale for a container in the form of a vehicle, the reader should appreciate that the system described herein can also be used for weighing other types of loads. For example, the system is suitable for weighing moving objects on a manufacturing conveyor system or on an assembly line. The system is used in weighing a container moving, e.g., product along a conveyor belt or rail system. In this arrangement, the scale is used to support a portion of the conveyor belt. In some embodiments the container is not wheeled. Rather, the conveyor belt includes rollers which move the containers. In further configurations, the container is in the form of an endless belt which may include raised sides.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A weigh-in-motion system, comprising:
   a base;
   a first platform structure supported by the base and movable with respect to the base;
   at least one first load cell assembly supporting a leading edge of the first platform structure, the at least one first load cell assembly configured to generate first data associated with a first load profile of the at least one first load cell assembly as a vehicle moves across the first platform structure;
   at least one second load cell assembly supporting a trailing edge of the first platform structure, the at least one second load cell assembly configured to generate second data associated with a second load profile of the at least one second load cell assembly as the vehicle moves across the first platform structure;
   a memory including program instructions stored therein; and
   a processor operably connected to the memory, the at least one first load cell assembly, and the at least one second load cell assembly, the processor configured to execute the program instructions to
      obtain the generated first data,
      obtain the generated second data,
      sum the obtained first and second data,
      identify a plateau of the summed obtained first and second data,
      determine a weight associated with the vehicle using the identified plateau, and
      generate an output based upon the determined weight,
   wherein the processor is further configured to execute the program instructions to:
      identify a crossover point of the first load profile with the second load profile based upon the obtained first and second data; and
      determine the weight associated with the vehicle using the identified crossover point.

2. The weigh-in-motion system of claim 1, wherein the processor is further configured to execute the program instructions to:
   identify a first time at which the vehicle moves onto the first platform structure using the obtained first data;
   identify a second time at which the vehicle moves off the first platform structure using the obtained second data;
   compare a first period of time from the first time to a time of the identified crossover to a second period of time from the time of the identified crossover to the second time; and
   identify the determined weight as unreliable when the first period of time and the second period of time differ by more than a predetermined amount.

3. The weigh-in-motion system of claim 1, wherein the processor is further configured to execute the program instructions to:
   identify at least one of a first negative slope of the first load profile using the obtained first data, and a first positive slope of the second load profile using the obtained second data;
   determine that a speed of the vehicle is greater than a predetermined threshold using the identified at least one first negative slope and first positive slope; and
   identify the determined weight as unreliable based upon the speed of the vehicle being determined to be greater than the predetermined speed threshold.

4. The weigh-in-motion system of claim 1, wherein the processor is further configured to execute the program instructions to:
   identify a first maximum of the first load profile using the obtained first data;
   identify a second maximum of the second load profile using the obtained second data;
   determine a window of significant data beginning with the first maximum and ending with the second maximum; and
   identify the crossover point of the first load profile with the second load profile based upon the obtained first and second data within the window of significant data.

5. The weigh-in-motion system of claim 4, wherein the processor is further configured to execute the program instructions to:
   identify at least one of a first negative slope of the first load profile within the window of significant data using the obtained first data, and a first positive slope of the second load profile within the window of significant data using the obtained second data;
   determine that a speed of the vehicle is greater than a predetermined threshold using the identified at least one first negative slope and first positive slope; and
   identify the determined weight as unreliable based upon the determined speed of the vehicle being greater than the predetermined speed threshold.

6. The weigh-in-motion system of claim 4, wherein the processor is further configured to execute the program instructions to:
   compare the obtained first data and the obtained second data to stored profile data associated with the vehicle, wherein the output is further generated based upon the comparison.

7. A weigh-in-motion system, comprising:
   a base;
   a first platform structure supported by the base and movable with respect to the base;
   at least one first load cell assembly supporting a leading edge of the first platform structure, the at least one first load cell assembly configured to generate first data associated with a first load profile of the at least one first load cell assembly as a vehicle moves across the first platform structure;
   at least one second load cell assembly supporting a trailing edge of the first platform structure, the at least one second load cell assembly configured to generate second data associated with a second load profile of the at least one second load cell assembly as the vehicle moves across the first platform structure;
   a second platform structure supported by the base and movable with respect to the base;
   at least one third load cell assembly supporting a leading edge of the second platform structure, the at least one third load cell assembly configured to generate third data associated with a third load profile of the at least one third load cell assembly as the vehicle moves across the second platform structure;
at least one fourth load cell assembly supporting a trailing edge of the second platform structure, the at least one fourth load cell assembly configured to generate fourth data associated with a fourth load profile of the at least one fourth load cell assembly as the vehicle moves across the second platform structure;
a memory including program instructions stored therein; and
a processor operably connected to the memory, the at least one first load cell assembly, and the at least one second load cell assembly, the processor configured to execute the program instructions to
obtain the generated first data,
obtain the generated second data,
obtain the generated third data, and
obtain the generated fourth data, and
determine a weight associated with the vehicle using the obtained first, second third, and fourth data, and
generate an output based upon the determined weight,
wherein the processor is further configured to execute the program instructions to:
at least one of compare the obtained first data to the obtained third data, and compare the obtained second data to the obtained fourth data, wherein the output is further generated based upon the comparison.

8. The weigh-in-motion system of claim 7, wherein the processor is further configured to execute the program instructions to:
at least one of identify a first crossover point of the first load profile with the second load profile based upon the obtained first and second data, identify a second crossover point of the third load profile with the fourth load profile based upon the obtained first and second data, and identify a third crossover point of an average of the first and third load profile with an average of the second and fourth load profile based upon the obtained first and second data,
wherein the weight is further determined by the processor using the identified crossover point.

9. The weigh-in-motion system of claim 8, wherein the processor is further configured to execute the program instructions to:
identify a first time at which the vehicle moves onto the first platform structure using the obtained first data;
identify a second time at which the vehicle moves onto the second platform structure using the obtained third data;
compare the first time to the second time; and
identify the determined weight as unreliable when the first time and the second time differ by more than a predetermined amount.

10. The weigh-in-motion system of claim 8, wherein the processor is further configured to execute the program instructions to:
identify at least one of a first negative slope of the average of the first and third load profile using the obtained first and third data, and a first positive slope of the average of the second and fourth load profile;
determine that a speed of the vehicle is greater than a predetermined threshold using the identified at least one first negative slope and first positive slope; and
identify the determined weight as unreliable when the speed of the vehicle is determined to be greater than the predetermined speed threshold.

11. The weigh-in-motion system of claim 8, wherein the processor is further configured to execute the program instructions to:
identify a first maximum of the average of the first and third load profile using the obtained first and third data;
identify a second maximum of the average of the second and fourth load profile using the obtained second and fourth data;
determine a window of significant data beginning with the first maximum and ending with the second maximum;
identify a crossover point of the average of the first and third load profile with the average of the second and fourth load profile based upon the averaged obtained first and third data and the averaged obtained second and fourth data within the window of significant data, wherein the weight is further determined by the processor using the identified crossover point.

12. The weigh-in-motion system of claim 11, wherein the processor is further configured to execute the program instructions to:
identify at least one of a first negative slope of the average first and third load profile within the window of significant data using the obtained first and third data, and a first positive slope of the average second and fourth load profile within the window of significant data using the obtained second and fourth data;
determine that a speed of the vehicle is greater than a predetermined threshold using the identified at least one first negative slope and first positive slope; and
identify the determined first weight as unreliable based upon the speed of the vehicle being determined to be greater than a predetermined speed threshold.

13. The weigh-in-motion system of claim 11, wherein the processor is further configured to execute the program instructions to:
compare the average of the first and third load profile and the average of the second and fourth load profile to stored profile data associated with the vehicle, wherein the output is further generated based upon the comparison.

14. A method of operating a weigh-in-motion system, comprising:
moving at least one first wheel of a vehicle onto a first platform structure supported by a base and movable with respect to the base;
generating, with at least one first load cell assembly supporting a leading edge of the first platform structure, first data associated with a first load profile of the at least one first load cell assembly as the vehicle moves across the first platform structure;
generating, with at least one second load cell assembly supporting a trailing edge of the first platform structure, second data associated with a second load profile of the at least one second load cell assembly as the vehicle moves across the first platform structure;
executing, with a processor, program instructions stored in a memory to
obtain the generated first data,
obtain the generated second data,
identify a crossover point of the first load profile with the second load profile based upon the obtained first and second data;
determine a weight associated with the vehicle using the identified crossover point, and
generate an output based upon the determined weight.

15. The method of claim 14, further comprising:
moving at least one second wheel of the vehicle onto a second platform structure supported by the base and movable with respect to the base;
generating, with at least one third load cell assembly supporting a leading edge of the second platform structure, third data associated with a third load profile of the at least one third load cell assembly as the vehicle moves across the second platform structure;
generating, with at least one fourth load cell assembly supporting a trailing edge of the second platform structure, fourth data associated with a fourth load profile of the at least one fourth load cell assembly as the vehicle moves across the second platform structure, wherein the processor further executes the program instructions to:
obtain the generated third data, and
obtain the generated fourth data, and
wherein the weight is further determined by the processor using the obtained third and fourth data.

16. The method of claim 15, further comprising:
identifying with the processor, a first time at which the vehicle moves onto the first platform structure using the obtained first data;
identifying, with the processor, a second time at which the vehicle moves onto the second platform structure using the obtained third data;
comparing, with the processor, the first time to the second time; and
identifying, with the processor, the determined weight as unreliable when the first time and the second time differ by more than a predetermined amount.

* * * * *